Patented Oct. 19, 1943

2,331,977

UNITED STATES PATENT OFFICE 2,331,977

PROCESS FOR MAKING SOFT MATERIALS FOR RAINCOATS, ETC.

William D. Hedges, John C. Lowman, and Thomas J. Kerr, Columbus, Ohio, assignors to Columbus Coated Fabrics Corporation, Columbus, Ohio, a corporation of Ohio No Drawing. Application January 19, 1940, Serial No. 314,685

2 Claims. (Cl. 117—161)

This invention pertains to the manufacture of soft, pliable material especially adapted for use as automobile headlinings, raincoats, garments and the like.

It is an object of this invention to produce an improved coated material having a soft pliable texture which is durable and retains its flexibility for a long period of time.

Another object is to provide a coated or impregnated fabric material which will not become tacky or sticky when subjected to a temperature of approximately 185 degrees F. for several hours.

Another object is to make a soft, pliable material which comprises a base supporting sheet of cloth of woven or felted construction which has been treated with a plasticized coating and dried.

Another object is to produce very soft and exceedingly flexible materials which retain their soft, pliable texture for a long period of time.

Another object is to provide a coated sheet material having a soft texture by applying to a flexible base material one or more coatings comprising a maleic-anhydride-glycol reaction product of castor oil as a softening agent.

Another object is to make a soft, pliable material from coated fabric wherein the coating comprises pyroxylin resin and a soft, fluffy filler with or without the addition of color pigments.

In the manufacture of soft, pliable fabric coated materials, relatively large amounts of plasticizers are required as a constituent of the coating to produce a flexible coating. Castor oil, blown oils, dibutyl phthalate, tricresyl phosphate, etc., have been employed heretofore as softening or plasticizing agents in compounding the flexible coatings for application to fabric but these materials, particularly castor oil, tend to exude from the coating at temperatures around 185 degrees F. making the product tacky or sticky, which is highly undesirable. Further, these plasticizers deteriorate upon aging after a relatively short period of time and lose their plasticizing property so that the coating becomes brittle and cracks when the material is flexed.

It has been discovered that these disadvantages can be substantially overcome by substituting for the conventional plasticizers a product made from castor oil by reacting to same either an unsaturated dibasic acid or the anhydride thereof and a dihydric alcohol. The product formed by reacting of these substances with castor oil has unexpected plasticizing properties, particularly in connection with its use in the compound of the cellulose derivative compositions. Coating compositions made with the use of the maleic acid-glycol-castor oil reacted product possess a high degree of flexibility and do not exude the plasticizer at the temperatures at which castor oil exudes. Moreover, the flexibility of the coating is retained over a much longer period of time than has been found possible with the use of castor oil or the conventional plasticizers heretofore mentioned. The modified castor oil product is also readily compatible with the ordinary lacquer and paint solvents so that it can be incorporated in the coating compositions without difficulty.

The following illustrate typical examples of the plasticizer utilized in forming the coated products of this invention:

Example I

A mixture of 150 parts by weight of castor oil, 31 parts by weight of glycol and 50 parts by weight of maleic anhydride is heated together in a reaction chamber, with or without stirring or blowing with $CO_2$, at a temperature of approximately 230 degrees C. for 12 hours. The reaction chamber is preferably equipped with a stirrer, and provision is made for escape of the water formed during the reaction, while at the same time loss of glycol is prevented. When the product is heat treated for this length of time the product is in the form of a gel. If it is desired to carry the resin to this state it is preferable to add a solvent such as toluol or xylol thereto while the resin is still hot. This prevents the resin from going into an insoluble state before it is used, and also provides a product which is readily dispersed in coating compositions. If $CO_2$ is used the alcohol compatibility of the resin is somewhat decreased and the cooking time is shortened. Carbon dioxide may be introduced by bubbling the gas through the mixture. With the use of carbon dioxide a lower acid value resin is produced.

Example II

In this example, 400 parts by weight of castor oil, 26 parts by weight of diethylene glycol and 50 parts by weight of maleic anhydride are mixed together and heated as described under Example I. Using the same temperature in cooking, the time is reduced from 12 to 8 hours. The acid number and alcohol solubility of the final resinous product are affected by the same factors as are noted under Example I. In this case the final product has an acid number of about 9 without the use of $CO_2$. By heat treating the resin for longer than 8 hours at a temperature between 200 and 250 degrees C. the final resinous product will be in the form of a difficultly soluble gel.

Example III

In this example, 800 parts by weight of castor oil, 50 parts by weight of maleic anhydride and 26 parts by weight of glycol, preferably diethylene glycol, are mixed together and heated, as set out in Example I. In this instance the cooking time is about 14 hours at 230 degrees C. The resinous product produced has an acid number of about 9. A longer cooking time will produce a substantially insoluble resin. Where the resin is to be cooked to produce a product having a high viscosity it is preferable to add toluol or xylol in sufficient amount while the resin is hot so as to prevent the product from going over into an insoluble state upon cooling. The resins made and described will continue to polymerize at temperatures below 200 degrees C. and even below 100 degrees C. so that the introduction of solvent to prevent the polymerization from continuing so as to produce an insoluble solid gel is required.

Example IV

In this instance, 1000 to 1200 parts by weight of castor oil are mixed with 26 parts by weight of diethylene glycol and 50 parts by weight of maleic anhydride and the mixture heat treated as in the previous example. The time required for cooking this batch is much longer than that for the previous example. It was found impossible to produce a gel from this combination even after cooking the resinous batch for 27 hours at 275 degrees C. The product, however, results in yielding a bodied oily resin having definite advantages as a plasticizer over raw castor oil.

It will be understood that this invention is not limited to the ingredients and particular proportion set out in the above examples and that equivalent compounds may be employed in making the plasticizing resin. Any oil comprising hydroxyl groups in its formula, which is capable of becoming dehydrated and which after such dehydration is converted into a drying oil, may be substituted for castor oil. Further, suitable portions of castor oil may be replaced with any one or more of the non-drying or semi-drying oils. Glycols having the general formula $C_nH_{2n}(OH)_2$ may be used in making the resin, diethylene glycol being preferable. Triethylene, propylene and higher glycols may be used in place of ethylene and diethylene glycol. Some glycols offer definite advantages over others, in certain cases, as for example when diethylene glycol is substituted for ethylene glycol, the cooking time of the resin is decreased. This invention, however, is applicable to the use of various polyhydric alcohols including glycerin which react similarly as the glycols to produce the plasticizing resin.

In the examples maleic anhydride is the polybasic acid preferably used, but other polybasic or monobasic unsaturated acids such as fumaric, acrylic, crotonic and the like may be utilized in place of maleic. In general, all unsaturated polybasic carboxylic acids of the aromatic, aliphatic or heterocyclic may be employed. The higher viscosity plasticizer compositions show less tendency to exude than the lower viscosity less polymerized plasticizer product. The plasticizer formulated using 800 parts of castor oil, as shown in Example III, has a viscosity of approximately 450 centipoises. In the formulation using 1000 parts of castor oil, as given in Example IV, the viscosity of the final product is about 60 centipoises.

In the production of soft coated products of this invention one or more coatings are applied to a suitable cloth fabric, or felted base material and each of the coatings is plasticized with the maleic-anhydride-glycol modified castor oil product of Examples I to IV. Due to the higher exudation temperature of the modified castor oil plasticizer, it has been possible to produce very soft and flexible materials which remain free from tackiness even when subjected to temperatures of from 185 to 200 degrees F. for several hours. Preferably, a coating comprising pyroxylin, resin and a soft bulky filler, or extender, such as diatomaceous earth, celite, or equivalent material, is incorporated with or without the usual color pigments and solvent is utilized.

For example, in making an automobile headlining material using a 2-ounce sheeting cloth, the following typical base coating composition is used:

Example V

| | Parts by weight |
|---|---|
| Nitrocellulose (30–40 sec. viscosity) | 10.0 |
| Plasticizer (Example III) | 15.0 |
| Plasticizer (Example IV) | 10.0 |
| Superfloss (diatomaceous earth) | 45.0 |
| Pigment | 5.0 |
| Solvent | 40.0 |

This base coating will represent approximately 60% of the coating. Over this base coating is applied a finish coating of one or more coats consisting of the following composition:

Example VI

| | Parts by weight |
|---|---|
| Nitrocellulose (30–40 sec. viscosity) | 10.0 |
| Plasticizer (Example III) | 5.0 |
| Plasticizer (Example IV) | 4.0 |
| Superfloss (diatomaceous earth) | 8.0 |
| Pigment | 2.0 |
| Solvent | 40.0 |
| Toluol | 9.0 |

The solvent referred to in the above examples preferably comprises by volume 45% ethyl acetate, 32½% alcohol, and 22½% xylol or toluol.

Other examples of coated materials utilized in coating a flexible base material comprising three coats are as follows:

Example VII

| | 1st coat | 2nd coat | 3rd coat |
|---|---|---|---|
| | Parts by weight | Parts by weight | Parts by weight |
| Nitrocellulose (30–40 sec. viscosity) | 10.0 | 10.0 | 10.0 |
| Plasticizer (Example III) | 26.0 | 19.5 | 10.5 |
| Butyl acetyl ricinoleate | 6.0 | 4.5 | 2.5 |
| Superfloss (diatomaceous earth) | 6.0 | 4.5 | 3.0 |
| Pigment | 6.0 | 4.0 | 2.0 |
| Solvent | 40.0 | 40.0 | 40.0 |

The solvent used is that conventionally employed for dissolving nitrocellulose and preferably comprises a mixture of ethyl acetate, alcohol and toluol or xylol, as given above in Example VI.

This material coated with the three-coat composition exhibited a high degree of flexibility on test, flexing 30,000 times before showing signs of failure and withstood 500 scrubs, such as washing with soap and water. The coated fabric also showed no tendency to spew at approximately 185 degrees F. and the coating did not crack even at a temperature of minus 22 degrees F.

As a typical formula for application to the light weight base sheeting for the preparation of raincoats and soft, pliable garments, the following is illustrated, utilizing one or more coats:

*Example VIII*

|  | 1st coat | 2nd coat | 3rd coat |
| --- | --- | --- | --- |
|  | Parts by weight | Parts by weight | Parts by weight |
| Nitrocellulose (30-40 sec. viscosity) | 10.0 | 10.0 | 10.0 |
| Plasticizer (Example III) | 40.0 | 17.0 | 14.0 |
| Butyl acetyl ricinoleate | 5.0 | 2.5 | 2.5 |
| Superfloss (diatomaceous earth) | 6.0 | 3.0 | 3.0 |
| Pigment | 8.0 | 3.0 | 1.0 |
| Solvent | 41.0 | 41.0 | 41.0 |

The ingredients of the coating compositions are compounded similarly as in the Example VII. The incorporation of butyl acetyl ricinoleate as a part of the plasticizer provides a coated fabric which is dry, pliable, resistant to cracking under low temperature conditions and will not spew at a temperature around 185 degrees F.

In the above coating formulations it has been found essential that the extender, or filler, must be incorporated with the other ingredients of the coating without grinding. When the filler, such as diatomaceous earth, was ground into the nitrocellulose solution and added in this manner to the composition, the coating film did not have as good flexibility as when the filler was merely mixed thoroughly into the liquid constituents of the coated composition. The best results were obtained when the diatomaceous earth was thoroughly mixed with the plasticizer before adding the balance of the ingredients. The color pigments, of course, are incorporated in the coating composition by grinding the same with the vehicle of the coating in the usual manner. Different pigments may be used which are preferably ground in the nitrocellulose and plasticizer composition, such as is commonly done in a ball mill. If desired, suitable driers may be incorporated in the composition to speed up the film formation, particularly where slow drying pigments are used. The addition of zinc, preferably in the form of naphthanate, will retard the drying action of the fast drying pigments so that mixtures of zinc naphthanate with other pigments which accelerate the drying of the coating may be made to control the drying of the final product.

The coating materials made in accordance with this invention are characterized by being soft, pliable and having a high degree of flexibility. This flexibility is retained during use and resists exudation of the softener. Further, it is noted that pigment influences the drying action of the plasticizer tending to form a gel which continues to plasticize the film without weakening it, whereas in the case of raw castor oil used as the plasticizer, these results are not obtained. Aside from this, more of the modified castor oil plasticizer can be incorporated in the coating films without encountering exudation difficulties than has been possible with the use of the conventional plasticizers, particularly raw castor oil.

It is understood that this invention is not limited to the specific examples given and that widely different embodiments of this invention may be made without departing from the spirit and scope thereof.

Having thus fully described our invention, what we claim as new and desire to secure by Letters Patent is:

1. In the process of making coated flexible materials for use as headlinings, raincoats, and the like, the steps comprising coating a flexible base material with a flexible film forming composition comprising nitrocellulose, plasticizer, and a flexibilizer comprising a reaction product of castor oil, maleic anhydride and glycol, said coating composition including diatomaceous earth as a filler, pigment, and solvent, said filler being mixed into the plasticizer and reaction product prior to introducing the same into the remaining constituents of the coating composition by stirring.

2. In the process of making coated flexible materials for use as headlinings, raincoats, and the like, the steps comprising coating a flexible base material with a flexible film forming composition comprising nitrocellulose, butyl acetyl ricinoleate as a plasticizer, and a flexibilizer comprising a reaction product of castor oil, maleic anhydride and glycol, said coating composition including diatomaceous earth as a filler, pigment, and solvent, said filler being mixed into the plasticizer and reaction product prior to introducing the same into the remaining constituents of the coating composition by stirring.

WILLIAM D. HEDGES.
JOHN C. LOWMAN.
THOMAS J. KERR.